Dec. 30, 1969     J. A. WILD     3,486,309

FIBER WASTE DISPOSAL SYSTEM FOR TEXTILE MACHINES

Filed Nov. 17, 1966     2 Sheets-Sheet 1

INVENTOR:
JAMES AUBREY WILD

BY Parrott, Bell, Seltzer, Park & Heard
ATTORNEYS

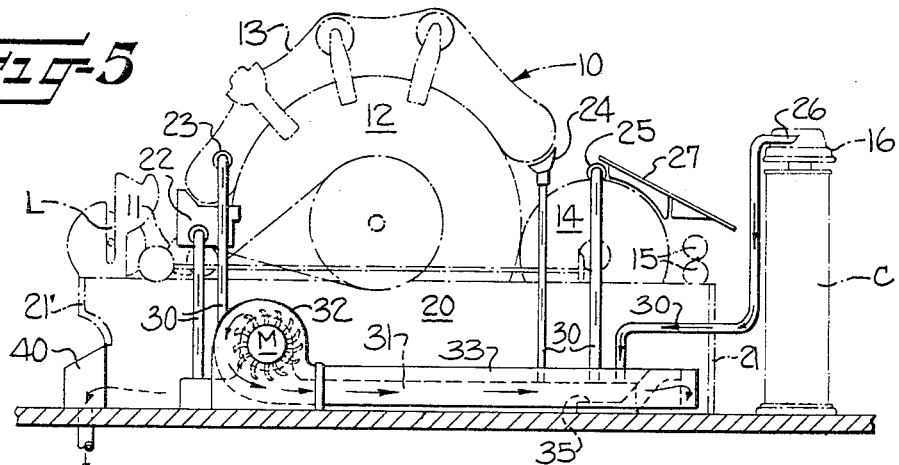
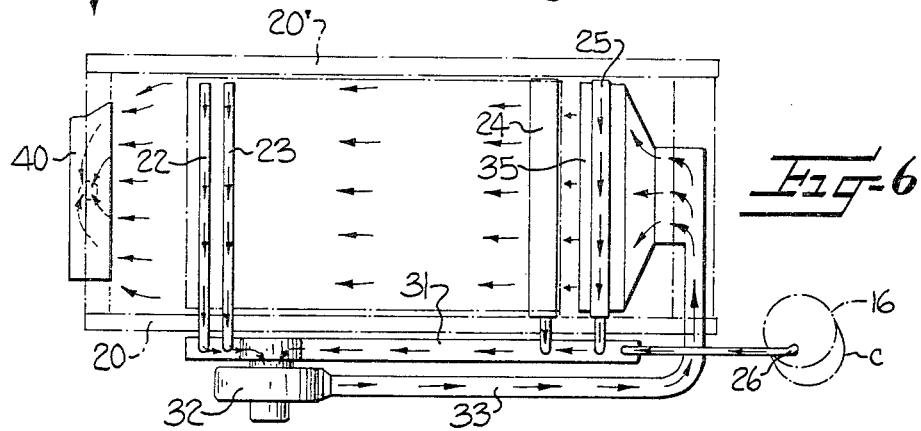
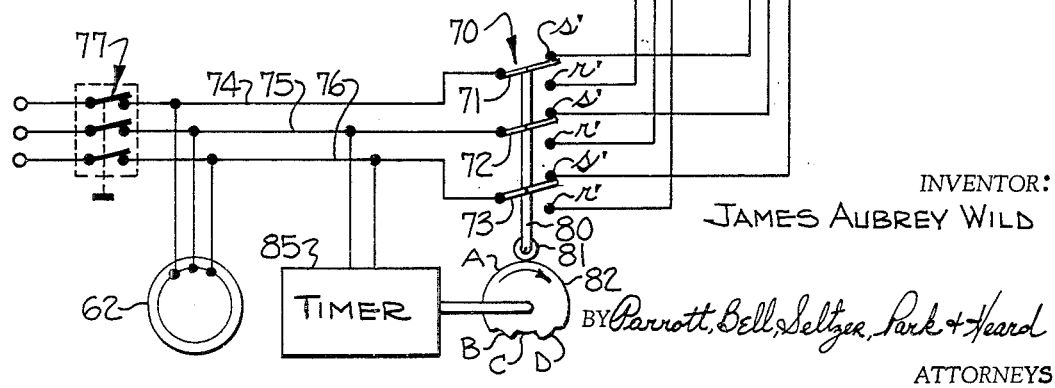
INVENTOR:
JAMES AUBREY WILD
BY Parrott, Bell, Seltzer, Park & Heard
ATTORNEYS

3,486,309
FIBER WASTE DISPOSAL SYSTEM FOR TEXTILE MACHINES

James Aubrey Wild, Bamford, Rochdale, England, assignor to Parks-Cramer (Great Britain), Ltd., Oldham, Lancashire, England, a British company
Filed Nov. 17, 1966, Ser. No. 595,201
Claims priority, application Great Britain, Nov. 17, 1965, 48,895/65
Int. Cl. B65b *1/00;* B01b *45/06*
U.S. Cl. 55—272                                             6 Claims

ABSTRACT OF THE DISCLOSURE

Apparatus for pneumatically conveying bulk fiber waste from a plurality of textile machines, separating the fiber waste from the air by means of a filter separator unit, wherein means is provided for periodically momentarily reversing the air flow through the filter to clean the same.

---

This invention relates to pneumatic fiber waste disposal systems for textile plants, and it is the primary object of this invention to provide an improved apparatus for pneumatically disposing of bulk fiber waste generated by the operation of textile machines while filtering the fiber waste from an air stream laden therewith and automatically cleaning the filtering medium at sufficiently frequent intervals to insure efficient disposal of the fiber waste by the air stream.

According to the present invention, a flowing air stream adjacent each of a plurality of textile machines picks up fiber waste at the machines and the fiber waste laden air stream is conveyed to a common collection area where it is filtered through a filtering medium inclined with respect to a vertical plane and with respect to the direction of flow of the air stream therethrough to cause fiber waste to be deflected by and gravitate from the filtering medium as it is separated from the air stream being exhausted from the collection area downstream of the filtering medium. To insure efficient flow of the air stream through the filtering medium, the air stream is automatically cut off periodically and at predetermined intervals and a second air stream is caused to flow through the filtering medium in a reverse direction to dislodge therefrom fiber waste adhering thereto. Thereafter, the reverse-flowing second air stream is stopped and the first-named fiber waste laden air stream is reactivated, the force and duration of the reverse-flowing second air stream being such that it does not flow for a period sufficiently long to produce a reverse flow of air at the textile machines.

In the apparatus according to the present invention, the flowing air stream is created adjacent each textile machine by means of at least one reversible fan disposed in the outlet of a housing defining the aforementioned collection area, there being at least one duct extending from the inlet of the housing and having inlets open to each machine, and control means is provided for periodically reversing the fan at predetermined intervals for periods of predetermined relatively short duration such that the reverse flow of air is effective to dislodge from the filtering medium lint and other fiber waste adhering thereto without causing a reverse flow of air at the duct inlets.

This invention has advantages over known prior art centralized fiber waste collection systems for groups of textile machines in that the filtering medium may be cleaned while employing no moving part other than the fan or fans which also produce the air stream for conveying fiber waste from the vicinity of the textile machines to the collection area, a positive cleaning of the filtering medium is effected, and a minimum variation in the conveying air stream is caused. The power consumption required is also low.

The fiber waste disposal system of this invention is especially useful in conjunction with groups of carding machines equipped with individual, self-contained, pneumatic cleaning systems, such as are disclosed in Reiterer's U.S. Patent No. 3,150,415 and in British Patent No. 931,907 published July 24, 1963. Such individual card cleaning systems are characterized in that fiber waste is sucked from various critical upper areas of the card, such as the card flats, the calender rolls, the coiler and from adjacent the doffer, and is blown into one end of an enclosure extending substantially throughout the length of the lower portion of the card and within which the lower portions of fiber-carrying components, including the lickerin, main cylinder and doffer, are disposed. Generally the fiber waste is blown along the floor defining the bottom of the enclosure so that fiber waste, including motes, trash, etc., which falls from and/or is blown off the fiber-carrying components, is conveyed, along with the fiber waste sucked from the upper areas of the carding machine, into a collector at the other end of the enclosure. The collector is provided with a filter through which air is exhausted into the room as the fiber waste accumulates in the collector, and the collector is emptied periodically by an attendant.

Recently, attempts have been made to pneumatically convey the fiber waste from the lower enclosures of groups of carding machines to a common collection area remote from the machines. To my knowledge, such attempts have not been commercially acceptable because the filtering medium in the collection area would become clogged with fiber waste to such extent that the fans of the individual card cleaning systems would increase the air pressure in the card enclosures above safe limits. For example, such increase in air pressure has been known to cause fiber waste to clog the lickerin screen and/or cylinder screen beneath the lickerin and main cylinder and to cause them to bend or buckle against and mutilate or seriously damage the clothing on the lickerin and/or the main cylinder, thus requiring considerable time and expense in replacing the damaged clothing and screens.

The fiber waste disposal system of the present invention eliminates the aforementioned problems associated with a common collection area for a plurality of individual card cleaning systems, and I have found that the efficiency of the present fiber waste disposal system is such that the air pressure in the card enclosures is maintained within safe limits, even though air is being forced into each enclosure. In other words, the pressure within each enclosure may be maintained substantially equal to or slightly below atmospheric pressure.

Therefore, it is another object of this invention to provide an apparatus in which a fiber waste-bearing blowing air stream is directed into a confined area beneath each of a group of carding machines, wherein air and fiber waste from the confined areas of the group of machines are evacuated from the confined areas to a common collection area, and wherein the air is evacuated from the confined areas at least as fast as that at which air is introduced into each confined area, thus continuously maintaining within safe limits the air pressure within each confined area to insure efficient cleaning of the carding machines while operating and to eliminate the problems which have been present heretofore due to the danger of excessive super-atmospheric air pressure being created in the confined areas beneath the carding machines.

Some of the objects having been stated, other objects will appear as the description proceeds when taken in connection with the accompanying drawings, in which:

FIGURE 5 is a side elevation of one of the carding machines shown in the upper portion of FIGURE 1, looking substantially along line 5—5 in FIGURE 1 and wherein the carding machine is shown in dash-and-dot lines, and showing the same equipped with its own individual pneumatic cleaning system in solid lines;

FIGURE 6 is a top plan view of the carding machine and the associated pneumatic cleaning system shown in FIGURE 5; and FIGURE 7 is a schematic diagram of the electrical control circuit for the centralized pneumatic fiber waste disposal system of the present invention.

Figure 1:
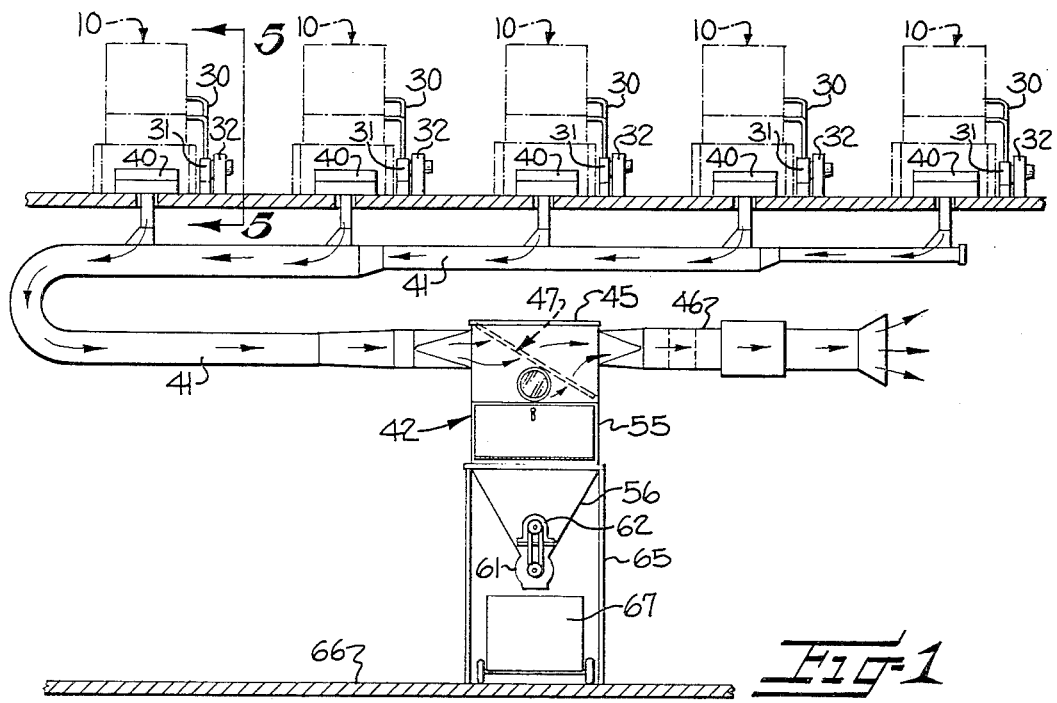
FIGURE 1 is a schematic layout of an embodiment of the fiber waste disposal system of the instant invention showing a group of textile machines, in the form of cards, with pneumatic conveyor means connecting the textile machines to the improved filter collection box.

The fiber waste disposal system of the present invention is devised for removing fiber waste (fibers, lint, motes, dust and/or other light and finely divided materials) from the vicinity of a plurality of textile machines, each of which is indicated generally at 10 in FIGURE 1 and which generate such fiber waste as an incident to the operation of the machines. The fiber waste disposal system is especially useful in conjunction with a group of carding machines each equipped with its own individual pneumatic cleaning system. Accordingly, by way of example, the machines 10 are shown in the form of carding machines.

As best shown in FIGURES 5 and 6, each carding machine may comprise fiber-carrying components including a lickerin 11 which receives fibers from lap L and transfers them to a main card cylinder or swift 12 having a cooperating chain of card flats 13 thereabove. From the main cylinder 12, the fibers being processed are transferred to a doffer or doffer cylinder 14 from which the fibers are usually drawn through a pair of calender rolls 15 in the form of a sliver coiled into a suitable container or can C by a coiler 16, as is usual.

The conventional side frame members 20, 20' and front and rear end frame members 21, 21' for the lower portion of the carding machine not only support the fiber-carrying components 11, 12, 14 of the machine, but also define a substantially airtight confined area or enclosure extending substantially throughout the length of the lower portion of each carding machine 10. The lower portions of the fiber-carrying components 11, 12, 14 extend into and serve, in part, as the upper boundary of the enclosure defined by frame members 20, 20', 21, 21'.

Each carding machine 10 may be equipped with an individual pneumatic cleaning system substantially of the type disclosed in Reiterer's said U.S. Patent No. 3,150,415 and in British Patent No. 931,907 published July 24, 1963, to which reference is made for a more detailed description thereof. As shown in FIGURES 5 and 6, fiber waste is sucked from various critical upper areas of the carding machine 10, above the level of the side frame members 20, 20', by means of a plurality of suction heads, there being five such suction heads shown in FIGURES 5 and 6 indicated at 22–26. These suction heads may take various forms, depending upon the carding machine elements to be cleaned thereby. As shown, suction head 22 is in the form of a trough or suction nozzle mounted at the front end of the machine and oriented to collect the dust blown from the card flats and any other dust generated at the front end of the machine. The suction head 23 is shown in the form of an elongate suction nozzle located between the runs of the chain of card flats 13 so as to collect dust or fiber waste which may tend to accumulate between the runs of the chain of card flats 13. The suction head 24 is shown in the form of an elongate trough whose open upper portion conforms substantially to the formation of the chain of card flats 13 at the frontmost portions thereof so that fibrous flat strips are sucked off the clothing of the card flats by the flow of air into trough 24. Suction head 25 is also in the form of an elongate nozzle extending over and closely adjacent the doffer 14 and cooperating with a doffer hood 27 for sucking lint and other fiber waste from this region. Suction head 26 is in the form of an open-ended suction nozzle which may be positioned closely adjacent the coiler feed rolls, not shown, to prevent excessive accumulation of fiber waste at the coiler 16.

Corresponding ends of suction heads 22–26 have corresponding pipes 30 extending downwardly therefrom whose lower ends are connected to a common suction duct 31 which may be positioned upon the floor beside side frame member 20 of the corresponding carding machine 10. Suction duct 31 is connected to the inlet side of a suction blower 32 which may be of the centrifugal type, and which has a blowing air duct 33 extending from its outlet side toward one end of the corresponding carding machine. In this instance, blowing duct 33 extends to the front end portion of the carding machine 10 in FIGURES 5 and 6 and then extends through side frame member 20 and has a rearwardly facing discharge or blowing nozzle 35 thereon disposed within the aforementioned enclosure and positioned closely adjacent the floor supporting the corresponding carding machine 10. Thus, the air stream discharged from nozzle 35, and the fiber waste borne thereby, are directed rearwardly beneath the fiber-carrying components 11, 12, 14. It is apparent that any motes, fibers or other forms of fiber waste which fall from or are blown off the lower portions of the fiber-carrying components by the air stream emanating from the discharge nozzle 35 are also directed toward the rear wall 21' of the corresponding enclosure by the air stream emanating from the discharge nozzle 35.

As heretofore stated, it has been the usual practice to direct the blowing air stream and the fiber waste borne thereby from discharge nozzle 35 along the floor defining the bottom of the enclosure beneath the carding machine and into a collector at the other end of the enclosure and, as the fiber waste accumulated in the collector, the air was exhausted into the room through a suitable filter. According to the present invention, the fiber waste and the air stream emanating from the discharge nozzle 35 associated with each carding machine 10 is directed into a suction mouthpiece 40 positioned adjacent or in engagement with the rear wall 21' of each carding machine 10 and communicating with the interior of the corresponding enclosure.

As shown in FIGURE 1, the suction mouthpieces 40 are communicatively connected to, and thereby serve as a plurality of inlets for, a common duct 41 extending from the textile machines 10 to a central collection area defined by a collection box or housing generally designated at 42. The collection box 42 is preferably of rectangular configuration in plan and may be provided with a removable cover or top wall 45 which has been omitted in FIGURE 4. Duct 41 is communicatively connected to the upper portion of collection box 42 and serves as an air inlet therefor.

The inlet duct 41 is preferably substantially axially aligned with an outlet duct 46 connected to the side wall of collection box 42 opposite from that to which duct 41 is connected and forming an air outlet for communication with the interior of collection box 42. The upper portion of the collection housing serves as an expansion chamber and positioned therein is an inclined filtering medium or filter screen 47 which extends transversely across box 42 between the inlet and outlet thereof at an acute angle, preferably about 30 degrees, with respect to a horizontal plane and with respect to the direction of flow of the air stream as it enters collection box 42 through the inlet duct 41.

Figure 4:
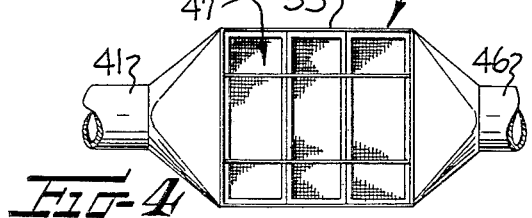
FIGURE 4 is a fragmentary top plan view of the collection box of FIGURE 1 with the top wall or cover thereof removed.

As shown in FIGURE 4, the filter screen may comprise three separate removable sections and stiffening bars, as shown. The upstream surface or downward-facing surface of filter screen 47 receives the unfiltered air stream from inlet duct 41, and the downstream surface or upward-facing surface of filter screen 47 is subjected to suction from one or more fans which are preferably of the axial-flow type and serve as normally active means producing a flowing air stream adjacent the textile machines into the inlets 40, along inlet duct 41 and into collection box 42 for entrapping and conveying fiber waste from the machines into collection box 42. In this instance, a set of three successively arranged axial-flow fans 51, 52, 53 is provided in outlet duct 46 for subjecting the upward-facing surface of inclined filtering medium or screen 47 to suction. The fans 51, 52, 53 are driven by respective electric motors 51', 52', 53'.

The collection box 42 has a deep well or collection area 55 below the filtering medium 47, and below the well 55 is a hopper 56. The bottom of hopper 56 is provided with a discharge opening 57 which may be opened and closed by a suitable valve means or through which the collected fiber waste may be discharged as desired. In this instance, a multiple-bladed expulsion roller or valve member 60 is provided in a somewhat cylindrically shaped portion 61 of the hopper 56 immediately above the discharge opening 57, and the expulsion roller 60 is rotated relatively slowly; e.g., seven revolutions per minute, by means of an electric motor 62 (FIGURES 1 and 7).

The entire filter box assembly may be mounted on a suitable stand or framework 65 at such a height above the corresponding floor 66 therebeneath that a waste collection truck 67 may be wheeled below the outlet 57 at the bottom of collection box 42, as shown in FIGURE 1.

Control means is provided for periodically and at controlled intervals inactivating the fans 51, 52, 53 producing the fiber waste conveying air stream and effecting a reverse flow of air through the filtering medium in a reverse direction for a period of short duration sufficient to dislodge from the lower surface of the filtering medium 47 fiber waste adhering thereto, and for thereafter stopping the reverse flow of air and reactivating the fans 51, 52, 53 to perform their normal function, with the period of short duration of the reverse flowing air being such that such reverse flow of air does not cause a reverse flow of air at the inlets 40 of duct 41.

Accordingly, a representative embodiment of such control means is shown in FIGURE 7 wherein corresponding windings s of the three fan motors 51', 52', 53' are connected in parallel to corresponding contacts s' of a control switch 70 having three movable armatures 71, 72, 73 which normally maintain contact between the contacts s' and respective lead conductors 74, 75, 76 leading from a suitable source of electrical energy, not shown. A suitable master switch 77 may be interposed in conductors 74, 75, 76. For purposes of description, the windings s of fan motors 51', 52', 53' may be termed as suction or forward windings, since energization thereof rotates the fans 51, 52, 53 in a forward direction such as to produce a suction air stream throughout the length of conduct 41 and at its inlets 40, through filtering medium 47 and through the portion of outlet duct 46 adjacent collection box 42, as represented by the arrows in FIGURE 2. Each of the fan motors may be of the reversible type and may, therefore, be provided with a reverse winding r. The control switch 70 may be arranged in the electrical circuit so as to effect reverse rotation of all the fans 51, 52, 53 at predetermined intervals of relatively short duration, if desired. However, it is preferred that the air stream employed in purging the downward-facing surface of filtering medium 47 is of lesser force than the fiber-conveying air stream. Therefore, only the reverse windings r of the fan motors 51', 52' are shown in FIGURE 7 connected in parallel to contacts r' of control switch 70, the latter contacts being spaced from the respective contacts s'. Control switch 70 may be actuated by any suitable means such as a timer or pressure differential switch, as shown. The movable armatures 71, 72, 73 of control switch 70 are connected to a common control arm 80 provided with a follower 81 thereon which may rest against the periphery of, or may be urged by any suitable means, not shown, against the periphery of a control cam 82 which represents part of a suitable adjustable rotary timer 85 of known type electrically connected to conductors 75, 76.

For purposes of description only, cam 82 is shown provided with stepped peripherally arranged control surfaces A–D. The configuration of cam 82 may be such that, when follower 81 is in engagement with the high control surface A, armatures 71–73 occupy the position shown in FIGURE 7 in which all the fans 51, 52, 53 are driven to rotate in their normal forward direction so as to draw air out of the control box 42. The control surfaces B, D are of an intermediate height such that, when either of them is engaged by follower 81, armatures 71, 72, 73 are spaced out of engagement with all contacts s', r', and so that all the fan motors 51', 52', 53' are then in deenergized condition. The low control surface C, whose arc is relatively short as compared to the arc of high control surface A, is so located that, when follower 81 is in engagement with low control surface C, the armatures 71, 72, 73 are then in engagement with contracts r' and thus energize the reverse windings r of fan motors 51', 52'. The motor 62 of expulsion roller 60 may be connected directly to lead conductors 74, 75, 76, as shown in FIGURE 7, so as to be controlled directly by a master switch 77.

In operation, when master switch 77 is closed, the three fans 51, 52, 53 rotate in the normal forward direction so as to create a suction air stream in the fiber-conveying inlet conduit 41 and at each of the inlets 40. Thus, fiber waste is picked up by the air streams entering the suction inlets 40 and is conveyed with the common air stream along inlet duct 41 and into collection box 42. Fiber waste, especially the heavier particles of fiber waste, borne by the air stream entering collection box 42, impinges against and is deflected downwardly away from the inclined downward-facing surface of filtering medium 47. It is apparent that the air pressure upon the upward-facing surface of filtering medium 47 is lower than that on the downward-facing surface thereof. The fiber waste is thus separated from the air stream by the filtering medium 47 as the air stream expands within the filter box and is then exhausted from the collection box through the outlet duct 46. In this connection, it will be noted that the collection box is of substantially greater width than the inlet and outlet conduits 41, 46 to insure that the air stream entering the collection box from inlet conduit 41 may expand and that the velocity thereof thus may be reduced as the air flows through the filtering medium 47 toward the outlet duct 46. In this way, it can be appreciated that some of the fiber waste conveyed into collection box 42 by the air stream may not even contact filtering medium 47 converging downwardly with respect to the waste-conveying air stream, but will simply precipitate toward the bottom of hopper 56.

After fans 51, 52, 53 have rotated in the forward direction for a substantial period of time, a thin, light film or mat of fiber waste may form over the downward-facing surface of filtering medium 47. However, at predetermined, periodic intervals established by timer 85, including its cam 82, and before the fibrous mat has built up to any substantial degree against the downwardly-facing surface of filtering medium 47 such as to impede the flow of air therethrough to any material extent (every ninety minutes, for example), the motors 51', 52', 53', of fans 51, 52, 53 are automatically switched off and allowed to run down, as by engagement of intermediate control surface B (FIGURE 7) with follower 81 and then the motors 51', 52' are switched on to drive the fans 51, 52 in the reverse direction for a short period, such as by engagement of the low surface C of cam 82 with follower 81.

Figures 2, 3:
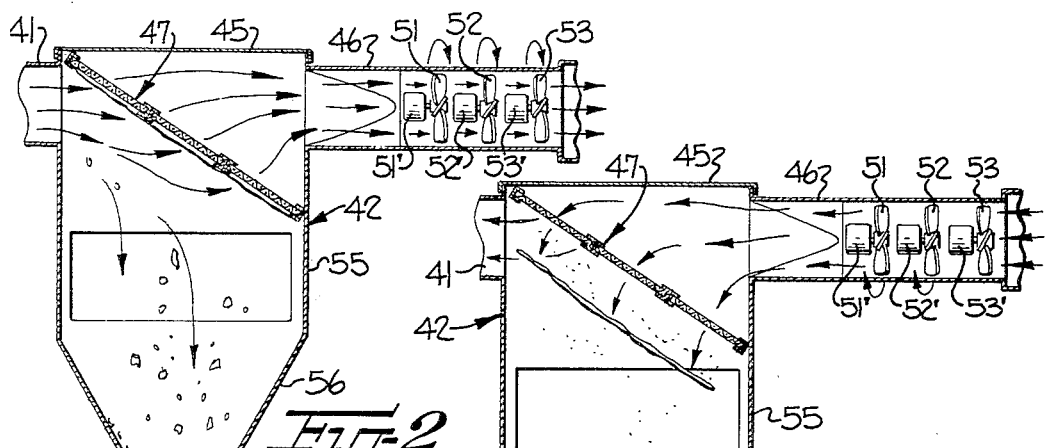
FIGURE 2 is an enlarged fragmentary vertical sectional view through the collection box in the lower central portion of FIGURE 1 and showing the air flow through the inclined filtering medium during the filtering of fiber waste from the conveying air stream.
FIGURE 3 is a view similar to FIGURE 2, but showing the air flow through the filtering medium in the reverse direction for purging from the filtering medium waste adhering thereto.

The duration of each momentary short period of reverse rotation of fans 51, 52, 53 may be on the order of two to five seconds, just sufficient to reverse the pressure differential on the two sides of the filtering medium 47 as the reverse-flowing air stream enters collection box 42 and passes through filtering medium 47 and thence into inlet duct 41, as represented by the arrows shown in FIGURE 3. It is apparent that the reversal of the pressure differential on the two sides of filtering medium 47 blows the mat of fibrous material off the downward-facing surface of filtering medium 47, as shown in FIGURE 3, so the mat falls to the bottom of hopper 18 and is removed, along with other fiber waste collected therein, by expulsion roller 60 into waste collection truck 67. It is important to note that the reverse flow of air into collection box 42 is of such short duration that it does not become effective at the inlets 40 to cause a reverse flow of air at the inlets.

Although the second or reverse-flowing air stream may be impelled along outlet duct 46 toward collection box 42 by fans 51, 52 at substantially less velocity than that at which the forward-flowing, waste-conveying, air stream is induced, alternatively, to flow along conduits or ducts 41, 46 by fans 51, 52, 53, the proximity of filtering medium 47 to the corresponding walls of box 42 and to outlet duct 46 is such that relatively little expansion of the reverse-flowing air stream may occur before it flows through filtering medium 47, as compared to the air expansion which may occur adjacent the downward-facing surface of filtering medium 47. Thus, the velocity of the filter cleaning air stream is relatively high as it flows through filtering medium 47 so as to further insure quick and effective removal of fiber waste from the downward-facing surface of filtering medium 47 each time the filter cleaning blowing air stream is produced.

After the reverse-flowing air stream has blown fiber waste off filtering medium 47, fan motors 51', 52' are again automatically switched off, as by engagement of intermediate control surface D with follower 81. Immediately thereafter, fan motors 51', 52', 53' are switched on to rotate all the fans in the forward direction, as by engagement of high surface A of cam 82 with follower 81.

The entire filter cleaning cycle can be completed in a very short time; e.g., on the order of about 15–20 seconds, without obstructing communication between the inlets 40 and inlet conduit 41 and between inlet conduit 41 and collection box 42. In other words, the filtering medium 47 may be cleaned automatically at predetermined spaced intervals without the necessity of providing any auxiliary filter cleaning devices, and without requiring the use of valves, dampers or the like which might obstruct the path along which the fiber waste is conveyed from the textile machines into the collection box. Further, once the fiber waste disposal system has been set up and the timer 85 has been adjusted to effect the optimum desired cycling of fan motors 51, 52, 53, very little, if any, manual attention will be required to insure continuous, trouble-free operation of the pneumatic fiber waste disposal system of this invention, other than occasional emptying of the truck 67 (FIGURE 1).

The number of fans and fan-driving motors employed in the apparatus may be varied according to the requirements of the particular installation. If only two fans are used, it has been found desirable to reverse both of them for cleaning the filter screen, while if the number of fans exceeds two, it is preferred that a majority of them shall be reversible for this purpose.

Since the filter cleaning cycles of the fans 51, 52, 53 can be carefully controlled according to the present invention, it can be appreciated that a positive cleaning of the filtering medium 47 is effected and that a minimum variation in the fiber waste conveying air stream is produced. Accordingly, the invention is especially useful in conjunction with the individual pneumatic cleaning systems of carding machines as heretofore described. According to the instant invention, the capacity of the fans 51, 52, 53 may be such as to tend to draw or evacuate a substantially greater amount or cubic feet per minute of air from each of the enclosures defined by the frame members at the lower portions of the carding machines 10 than that being introduced into such enclosures by the corresponding suction blowers 32, thus preventing the build-up of excessive or unsafe air pressure within the enclosures by tending to maintain a sub-atmospheric air pressure within the enclosures beneath the fiber-carrying components of the carding machines at all times during the operation thereof and during the operation of the pneumatic fiber waste disposal system of the present invention.

This is possible not only because the filtering medium 47 is maintained in a substantially clean condition at all times, but because the reverse flow of air employed in cleaning the filtering medium is of such force and of short duration that it will not cause a reverse flow of air at the inlets 40. In practice and by way of an unlimiting example, it has been found desirable that the air stream enter the enclosure beneath the fiber-carrying components of each carding machine 10 through the corresponding discharge nozzle 35 (FIGURES 5 and 6) at a volume of about 650 cubic feet per minute, and that the air stream tends to enter each of the air inlets 40 at a volume of about 850–1,000 cubic feet per minute; i.e., the capacity of fans 51, 52, 53 substantially exceeds that at which the blowing air streams are introduced into the card enclosures. It can thus be seen that, as long as the individual card cleaning systems and the pneumatic fiber waste disposal system of the present invention are operating in their normal manner, including the filter cleaning cycles heretofore described, the air in each of the enclosures beneath the fiber-carrying components of the carding machines 10 is withdrawn from the enclosures at least as fast as it is introduced into the enclosures, thus insuring that the force of the air flow into each enclosure from the corresponding discharge nozzle 35 will not damage the conventional screens beneath the fiber-carrying components and thus will not damage the card clothing on such components, or other parts of the carding machines.

It is thus seen that I have provided a novel means for disposing of fiber waste generated as an incident to the operation of textile machines, wherein the fiber waste is picked up by air streams at the respective machines, which air streams preferably are ultimately combined into a single waste-conveying air stream and conveyed therewith to a collection area where the air stream expands and flows toward the downward-facing surface of and then through a filter medium inclined at an acute angle with respect to the direction of flow of the air stream so fiber waste may impinge against and be deflected downwardly by the filtering medium. Further, it can be seen that the filtering medium is cleaned automatically and repeatedly at predetermined intervals, preferably by cutting off and momentarily reversing the fans which produce the waste conveying air stream to produce a momentary reverse-flowing air stream which flows in the reverse direction through the filtering medium to quickly and effectively dislodge therefrom fiber waste adhering to the same, after which forward rotation of the fans is resumed, all without effecting a reverse flow of air at the textile machines.

I claim:

1. Apparatus for disposing of textile fiber waste of substantial volume generated as an incident of the operation of a plurality of textile machines comprising a pneumatic conveyor including at least one air flow duct having inlets adapted to be communicatively connected to each textile machine for receiving fiber waste therefrom, a central collection housing including an expansion chamber in the upper portion thereof having an air inlet communicatively connected to said air flow duct and an air outlet spaced from said inlet, fan means positioned in said outlet for producing a flowing air stream within said air flow duct for conveying fiber waste laden air from said inlets to said collection housing, a filter extending across said expansion chamber between said air inlet and outlet and through which the air flows from said inlet to said outlet, said air outlet being positioned above adjacent portions of the filter on the downstream side thereof, said filter having a lower surface on the upstream side thereof against which separated fiber waste impinges as air flows therefrom to the outlet, and control means operatively connected to said fan means for automatically reversing said fan means at periodic intervals for short periods of time to cause a reverse flow of air through said filter during each period to dislodge fiber waste adhering to said lower surface of said filter and to assist the fiber waste in gravitating from such surface into a lower portion of said collection housing.

2. Apparatus according to claim 1 in which said fan means comprises a plurality of fans positioned in said air outlet and normally rotating in a forward direction, and wherein said control means for reversing said fan means to cause a reverse flow of air through the filter comprises means for stopping said fans and for temporarily reversing at least one of said fans.

3. Apparatus according to claim 2 wherein said control means includes a timer operatively connected to said fans for momentarily reversing said at least one of said fans, and said timer being operable to thereafter restart all the fans in a forward direction.

4. Apparatus according to claim 1 in which said fan means comprises a plurality of fans positioned in said air outlet and normally rotating in a forward direction, and wherein said control means for reversing said fan means comprises means for stopping all of the fans and momentarily reversing less than all the fans to produce a reversely flowing air stream of a lesser velocity.

5. Apparatus according to claim 1 in which said apparatus includes in combination therewith a plurality of carding machines each having a confined area therebeneath into which fiber waste is directed by air, and said duct inlets being connected to said areas.

6. Apparatus according to claim 1, wherein said collection housing is provided with a discharge opening in its lower portion below said filter, and valve means operatively associated with said opening for evacuating collected fiber waste through said opening.

References Cited

UNITED STATES PATENTS

| | | | |
|---|---|---|---|
| 739,733 | 9/1903 | Sobotka et al. | 55—430 |
| 1,048,477 | 12/1912 | Allington | 55—419 |
| 1,538,292 | 5/1925 | Lindsay | 55—303 |
| 1,597,051 | 8/1926 | Brown | 55—418 |
| 2,602,878 | 7/1952 | Hollody | 55—418 |
| 2,765,047 | 10/1956 | Hershey | 55—302 |
| 2,830,674 | 4/1958 | Dolf et al. | 55—218 |
| 2,924,062 | 2/1960 | Sutcliffe | 57—56 |
| 3,053,700 | 9/1962 | Kulp | 55—428 |
| 3,115,000 | 12/1963 | Naegeli | 57—56 |
| 3,116,238 | 12/1963 | Van Etten | 55—459 |
| 3,150,415 | 9/1964 | Reiterer | 19—107 |
| 3,204,296 | 9/1965 | Reiterer | 19—107 |
| 3,243,940 | 4/1966 | Larson | 55—96 |
| 3,343,197 | 9/1967 | Carsey | 15—301 |
| 3,059,896 | 10/1962 | Reiterer | 57—56 |
| 3,188,680 | 6/1965 | Black | 55—302 |

FOREIGN PATENTS 740,391    11/1955    Great Britain.

HARRY B. THORNTON, Primary Examiner

B. NOZICK, Assistant Examiner

U.S. Cl. X.R.

15—301, 352; 19—107; 55—302, 319, 432, 483; 230—42, 114